(12) United States Patent
Wadhwa et al.

(10) Patent No.: US 9,944,867 B2
(45) Date of Patent: Apr. 17, 2018

(54) SYSTEM AND METHOD FOR PREPARING HYDROCARBON BLEND FROM MULTIPLE COMPONENT STREAMS

(71) Applicant: Reliance Industries Limited, Mumbai (IN)

(72) Inventors: Anil Wadhwa, New Delhi (IN); Ashish Ranjan Jha, Vadodara (IN); Chandra Saravanan, Navi Mumbai (IN); Asit Kumar Das, Jamnagar (IN); Pinakiranjan Sankarprasad Patra, Ahmedabad (IN); Sukumar Mandal, Faridabad (IN); Praveen Kumar Chinthala, District: Medak (IN); Gopal Ravichandran, Coimbatore (IN); Sudhirkumar Raojibhai Patel, Dist-Vadodara (IN); Anand Raj Rajan, Pondicherry (IN); Ashok Swamisharan Pathak, Nagpur (IN); Saumya Srivastava, Lucknow (IN)

(73) Assignee: Reliance Industries Limited, Mumbai (IN)

( * ) Notice: Subject to any disclaimer, the term of this patent is extended or adjusted under 35 U.S.C. 154(b) by 379 days.

(21) Appl. No.: 14/150,390

(22) Filed: Jan. 8, 2014

(65) Prior Publication Data
US 2014/0194657 A1    Jul. 10, 2014

(30) Foreign Application Priority Data
Jan. 8, 2013    (IN) .............................. 59/MUM/2013

(51) Int. Cl.
*C10L 1/04*    (2006.01)
*G05D 11/13*    (2006.01)

(52) U.S. Cl.
CPC .............. *C10L 1/04* (2013.01); *G05D 11/132* (2013.01)

(58) Field of Classification Search
CPC ..... G05D 11/00; G05D 11/135; G05D 11/132
See application file for complete search history.

(56) References Cited

U.S. PATENT DOCUMENTS 5,223,714 A * 6/1993 Maggard .............. G01N 21/359
                                                     250/339.12
5,537,914 A * 7/1996 Gibney ................ B67D 1/0016
                                                     137/101.19

(Continued)

*Primary Examiner* — Sean E Conley
*Assistant Examiner* — Benjamin R Whatley
(74) *Attorney, Agent, or Firm* — McCarter & English, LLP (57) ABSTRACT

A computer implemented blend control system and method for preparation of a hydrocarbon blend from a plurality of components drawn from respective component tanks have been disclosed. The system, in accordance with the present disclosure includes at least one sensor and analyzer adapted to sense and analyze a first attribute of at least one of the components for obtaining first attribute data. The system further includes, at least one optimizer having a data storage means for storing attribute based model data. The optimizer receives the first attribute data and transmits the received first attribute data to a comparator which computes an optimized proportion data between each of the component streams to enable selective drawing of each of the component streams in accordance with the optimized proportion data for preparing the hydrocarbon blend.

4 Claims, 8 Drawing Sheets (56) References Cited

U.S. PATENT DOCUMENTS

| | | | | |
|---|---|---|---|---|
| 5,600,134 | A * | 2/1997 | Ashe | G01N 33/2829 |
| | | | | 250/252.1 |
| 5,684,580 | A * | 11/1997 | Cooper | G01N 33/2835 |
| | | | | 356/301 |
| 6,290,734 | B1 * | 9/2001 | Scott | C10L 1/023 |
| | | | | 208/17 |
| 2004/0250850 | A1 * | 12/2004 | Murray | G05D 11/131 |
| | | | | 137/93 |
| 2006/0035381 | A1 * | 2/2006 | Bary | B01F 15/00207 |
| | | | | 436/55 |
| 2009/0299109 | A1 * | 12/2009 | Gruber | C10L 1/04 |
| | | | | 585/14 |
| 2011/0005190 | A1 * | 1/2011 | Bauldreay | C10L 1/04 |
| | | | | 60/39.461 |
| 2011/0160921 | A1 * | 6/2011 | Petit | G05D 11/139 |
| | | | | 700/285 |
| 2012/0114813 | A1 * | 5/2012 | Bippert | A23L 2/02 |
| | | | | 426/231 |
| 2012/0203038 | A1 * | 8/2012 | Mattingly | C10L 1/06 |
| | | | | 585/1 |
| 2013/0036660 | A1 * | 2/2013 | Woods | C10G 3/42 |
| | | | | 44/307 |

\* cited by examiner

SYSTEM AND METHOD FOR PREPARING HYDROCARBON BLEND FROM MULTIPLE COMPONENT STREAMS

RELATED APPLICATIONS

This application claims the benefit of Indian Patent Application No. 59/MUM/2013 filed on Jan. 8, 2013. The entire disclosure of this application is incorporated herein by reference.

FIELD OF THE DISCLOSURE

The present disclosure relates to a blend control system for the preparation of a hydrocarbon blend. More particularly, the present disclosure relates to a system and a method of regulation of various component streams used for the preparation of a hydrocarbon blend.

DEFINITIONS OF TERMS USED IN THE SPECIFICATION

As used in the present disclosure, the following words and phrases are generally intended to have the meanings as set forth below, except to the extent that the context in which they are used indicate otherwise.

The term 'attribute' as used in this specification includes the composition of various component streams of the hydrocarbon blend, property specifications of the hydrocarbon blend, physical/chemical structure of the hydrocarbon blend and performance characteristics of the hydrocarbon blend.

The term 'composition of component streams of the hydrocarbon blend' as used in this specification includes any one of the composition of reformate, alkylate, FCC naphtha, straight run naphtha, ethanol, or tertiary amyl methyl ether.

The term 'property specifications of the hydrocarbon blend' as used in this specification includes any one of the property specifications such as RON (research octane number), MON (motor octane number) and density, composition of sulphur in the hydrocarbon blend, density of hydrocarbon blend, composition of benzene, olefins and aromatics, cetane number and cetane index of the hydrocarbon blend, flash point measurements, or cloud point/cold filter plugging point measurements.

The term 'property data' of a hydrocarbon blend in the specification includes any one of the research octane number (RON), motor octane number (MON), reid vapor pressure (RVP), density, cetane number, cetane index, cloud point, cold filter plugging point, or flash point.

The term 'composition data' of a hydrocarbon blend in the specification includes any one of the composition of reformate, alkylate, FCC naphtha, straight run naphtha, ethanol or tertiary amyl methyl ether.

The term 'analyzing' includes using a computer/microprocessor and appropriate software to identify molecular species and reconcile data from various sensing technologies. The analysis step results in characterization of either the composition or the property of hydrocarbon blends.

The term 'product specification' or 'standard specification' means a list of properties that is specified by customers to ensure that the product meets a required quality.

The term 'product blends' refers to mixtures of hydrocarbon streams used to meet specific product specifications.

The term 'Controlling' means adjusting the flow of component streams either manually or through an automated system.

BACKGROUND OF THE INVENTION

Products from refinery such as gasoline, diesel and the like are produced by blending various component streams in order to meet product specifications. For example, gasoline blend is produced in a refinery by blending streams such as reformate, alkylate, FCC naphtha, straight run naphtha, ethanol, TAME and the like. Gasoline production is constrained by property specifications such as RON, MON, RVP, density, distillation, sulfur, aromatics, olefins, benzene and the like. Each of these component streams have different properties and are blended in various proportions to meet gasoline specifications.

These component streams have minor to large property fluctuations on a day to day basis. Based on the component stream property values, the blend proportions are altered to meet the specifications. Experimental techniques and tests for analysis of gasoline include RON/MON by CFR engine test (ASTM D2700, EN 25163, IP 236, ASTM D2699, EN 25164, IP 237), distillation by ASTM D86, RVP by ASTM D323, API/density by ASTM D-287, D-1298, sulfur content by X-Ray ASTM D-4294/D-2622, benzene and total aromatics by D3606, D5769, D5580, aromatics/olefins by ASTM D-1319, mercaptan sulfur by D-3227 etc. For diesel, these techniques include cetane number ASTM D-613, IP 41, EN ISO 5165, distillation by ASTM D86, cetane index by ASTM D-4737, IP 380, EN 4264, ASTM D-976, API/density by ASTM D-287, D-1298, flash point measurements, cloud point/cold filter plugging point measurements, sulfur by ASTM D2784, D3246, D3961, D4468, D6212, D6667, D5453, D7039, (EDXRF) ASTM D4294 etc.

However, these approaches for analysis of the component streams suffer from drawbacks. Firstly, the above mentioned techniques for analysis of the component streams are time consuming Depending upon the lab set up the time period required for conducting these analytical tests can be one to two days. This makes it practically impossible to analyze all the component streams on a day to day basis.

In order to meet a specification, schedulers have to rely on their judgment while blending the different component streams. This approach can sometimes results in (a) quality give away (QGA) i.e. products have better properties than what is needed/specified, or (b) product failures i.e. products do not meet specifications.

There is thus felt a need for a system and a method for preparation of hydrocarbon blends with pre-determined specification by blending different component streams that involves frequent regulation of the proportion of each component stream during the blending and wherein the regulation of the proportion of each of the component stream in the blend is carried out on the basis of frequent analysis of the properties or compositions of each of the component streams.

OBJECTS

Some of the objects of the present disclosure are described herein below:

It is an object of the present disclosure to improve one or more problems of the prior methods or to at least provide a useful alternative.

It is an object of the present disclosure to provide a system and a method for the preparation of a hydrocarbon blend that allows frequent analysis of at least one of the component streams.

It is another object of the present disclosure to provide a system and a method that regulates the flow of at least one of the component streams so as to obtain a hydrocarbon blend with the desired specifications.

It is yet another object of the present disclosure to provide a system and a method for preparation of a hydrocarbon blend that minimizes quality give away or product failures.

It is still another object of the present invention to provide a system and a method for the preparation of a hydrocarbon blend that allows a better process control.

Other objects and advantages of the present disclosure will be more apparent from the following description when read in conjunction with the accompanying figures, which are not intended to limit the scope of the present invention.

SUMMARY OF THE INVENTION

The present disclosure envisages a computer implemented blend control system for preparation of a hydrocarbon blend from a plurality of components drawn from respective component tanks. The system, in accordance with the present disclosure comprises:
  a) a plurality of sensors and analyzers, wherein each sensor and analyzer of said plurality of sensors and analyzers is adapted to sense and analyze a first attribute of each of the plurality of the component[s] streams for obtaining a first attribute data of each of the plurality of the component streams;
  b) a plurality of processors operatively connected to said plurality of sensors and analyzers, wherein each processor of said plurality of processors is adapted to process the first attribute data of each of the plurality of the component streams for obtaining a second attribute of each of the plurality of the component streams and deriving a second attribute data of each of the plurality of the component streams; and
  c) at least one optimizer connected to said plurality of processors, said at least one optimizer having,
    i) a data storage means for storing attribute based model data,
    ii) a receiver for receiving the first attribute data, and
    iii) a comparator adapted to compare the first attribute data with the attribute based model data, said comparator means further adapted to compute an optimized proportion data between each of the component streams to enable selective drawing of each of the component streams in accordance with the optimized proportion data for preparing the hydrocarbon blend.

In accordance with the present disclosure, the system further comprises a flow regulator operatively connected to the at least one optimizer and individual component tanks, said flow regulator adapted to control the flow of component streams based on the optimized proportion data.

In accordance with the present disclosure, the first and the second attributes can be the same or different from each other.

In accordance with the present disclosure, the first attribute data is a combination of data corresponding to the data of each of the component streams, wherein said combination of data is processed by the processor to derive a combined second attribute data.

In accordance with the present disclosure, the first attribute of said each of the plurality of the component streams is a property attribute, the first attribute data is property data, the second attribute of said each of the plurality of the component streams is a composition attribute, the second attribute data is composition data, and the attribute based model data is composition based model data.

In accordance with the present disclosure, the first attribute of said each of the plurality of the component streams is a composition attribute, the first attribute data is composition data, the second attribute of said each of the plurality of the component streams is a property attribute, the second attribute data is property data, and the attribute based model data is property based model data.

In accordance with the present disclosure, the flow regulator is further adapted to adjust at least one control valve.

In accordance with the present disclosure, the flow regulator comprises at least one flow sensor.

In accordance with the present disclosure, the separator and analyzer comprises a combination of a separating means and at least one detector means.

In accordance with the present disclosure, the sensor and analyzer is adapted to sense the first attribute at pre-determined time intervals, said time intervals ranging between 1 hour and 24 hours.

The present disclosure further envisages a computer implemented method for the preparation of a hydrocarbon blend from a plurality of components. The method, in accordance with the present disclosure comprises the following steps:
  drawing the plurality of components from respective component tanks;
  sensing and analyzing a first attribute of at least one of the components, to determine first attribute data;
  comparing the first attribute data with pre-stored attribute based model data;
  computing optimized values of proportions based on the comparison of the first attribute data and determining the optimized proportion data corresponding to each of the component streams; and
  controlling the flow of component streams based on the proportion data for preparing the hydrocarbon blend.

In accordance with the present disclosure, the method further comprises the following steps:
  processing the first attribute data to derive a second attribute data; and
  for comparing the second attribute data with the pre-stored attribute based model data.

In accordance with the present disclosure, the first attribute and the second attribute are the same.

In accordance with the present disclosure, the first attribute and second attribute are different from one another.

DETAILED DESCRIPTION OF THE ACCOMPANYING DRAWINGS

Figure 1:
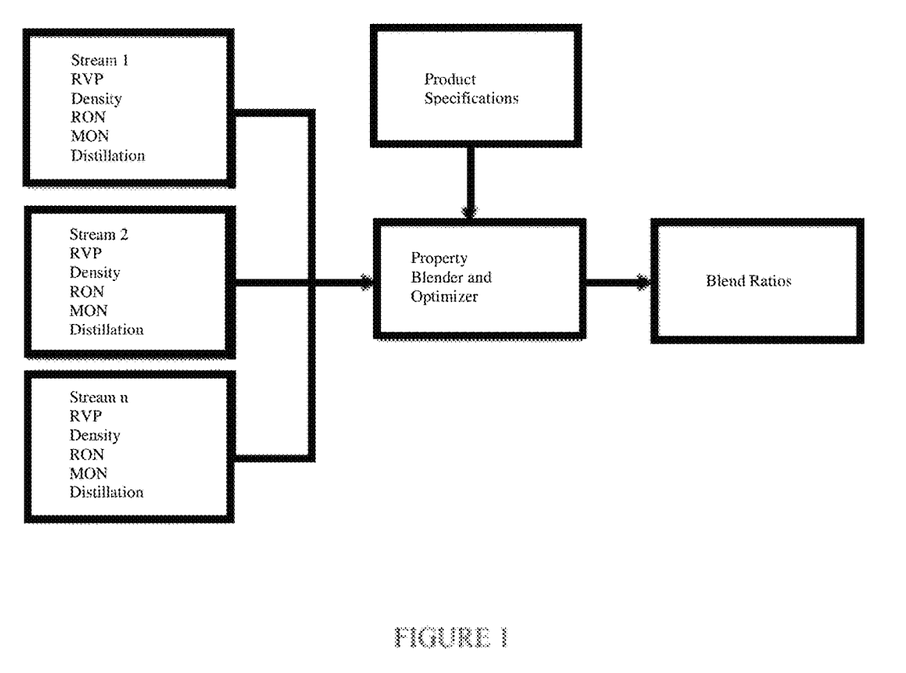
FIG. 1 illustrates a flow scheme for property based blender with stream properties from conventional laboratory analysis.

The hitherto reported methods for the preparation of hydrocarbon blends involve analysis of properties of component streams using various experiments in the laboratory which include RON/MON by CFR engine test (ASTM D2700, EN 25163, IP 236, ASTM D2699, EN 25164, IP 237), distillation by ASTM D86, RVP by ASTM D323, API/density by ASTM D-287, D-1298, sulfur content by X-Ray ASTM D-4294/D-2622, benzene & total aromatics by D3606, D5769, D5580, aromatics/olefins by ASTM D-1319, mercaptan sulfur by D-3227, cetane number ASTM D-613, IP 41, EN ISO 5165, cetane index by ASTM D-4737, IP 380, EN 4264, ASTM D-976, flash point measurements, cloud point/cold filter plugging point measurements, sulfur by ASTM D2784, D3246, D3961, D4468, D6212, D6667, D5453, D7039, (EDXRF) ASTM D4294 and the like. All of these presently known methods are time consuming and one cannot therefore analyze each of the component streams on a day to day basis before blending (FIG. 1).

In accordance with the present disclosure, there is provided a computer implemented blend control system for preparing a hydrocarbon blend from a plurality of components drawn from the respective component tanks. The blending of the components from a plurality of component streams is typically based on determination of properties/composition of the component streams. The properties/composition of component streams are determined by performing an analysis of the composition streams which are typically stored in individual component tanks. To determine the properties/composition of the component streams, firstly, the composition of each of the component streams is measured using gas chromatography (GC) technique. Multiple analyses of the composition of each of the component streams is carried out at a time interval ranging between 1 hour and 24 hours, preferably at a time-interval of 2 hours. The gas chromatography analyzer estimates the properties associated with each of the component streams based on the analysis of the composition corresponding to each of the component streams. The estimated property data provided by the gas chromatography technique is converted into property data of hydrocarbon blend.

In accordance with the present disclosure, for most of the estimated properties, the property estimates are within ASTM accuracy of the corresponding process. Properties of hydrocarbons such as research octane number (RON), motor octane number (MON), reid vapor pressure (RVP), density, cetane number, cetane index, cloud point, cold filter plugging point, flash point and a ratio of components in the hydrocarbon blend can be analyzed.

Mathematical expressions that are used for converting the composition data of a component stream to property data are:

$$\rho_{stream} = \sum_i \rho_i v_i$$

$$RVP_{stream} = \sum_i \alpha \cdot RVP^{\beta_i} \cdot v_i$$

where $\rho_{stream}$ and $\rho_i$ are the densities of the streams and their molecular components, $RVP_{stream}$ and $RVP_i$ are the RVPs of the streams and their molecular components Composition to property models are used to calculate properties. For gasoline, properties such as density, distillation properties, Reid Vapor Pressure (RVP), Research Octane Number (RON), Motor Octane Number (MON) and other secondary properties (e.g. drivability index which depends on distillation properties, antiknock index (AKI) depend on RON/MON and the like).

In accordance with the present disclosure, the gas chromatography analyzer comprises PIONA (paraffins, isoparaffins, olefins, naphthenes and aromatics) analyzer. The gas chromatography analyzer in accordance with the present disclosure is further configured to perform DHA (detailed hydrocarbon analysis) of each of the component streams.

TABLE 1

Model results and practical results in lab for a gasoline sample

| Property | Model | Lab |
| --- | --- | --- |
| Density (Kg/m$^3$) | 762.0 | 757.6 |
| RVP (kPa) | 45.4 | 42.2 |
| RON | 96.5 | 96.4 |
| MON | 85.2 | 85.4 |
| E70 (%) | 22.1 | 21.5 |
| E100 (%) | 42.9 | 40.6 |
| E180 (%) | 95.1 | 93.3 |
| Benzene (%) | 1.0 | 1.1 |
| Olefine (%) | 15.7 | 14.8 |
| Aromatics (%) | 38.2 | 39.2 |

Figure 2:
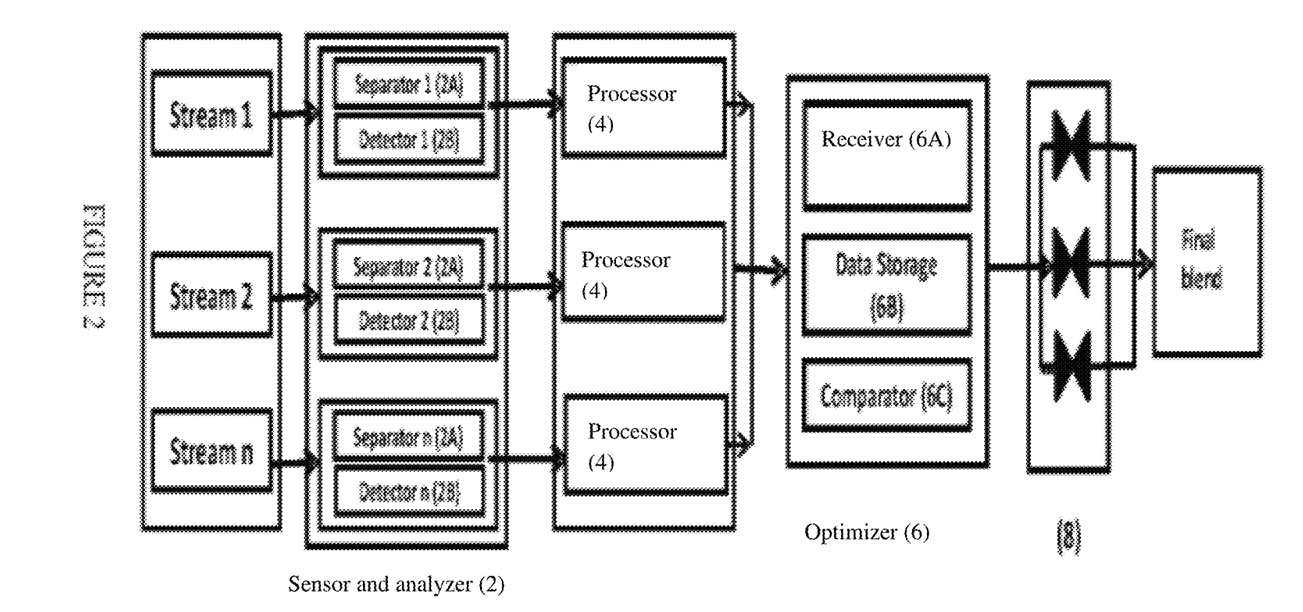
FIG. 2 illustrates a schematic of a computer implemented blend control system for property based/composition based blend optimization, wherein the component streams flow individually through the system, in accordance with one embodiment of the present disclosure.

In accordance with one embodiment of the present disclosure, there is provided a property based computer implemented blend control system for selectively regulating the blending of at least two components by online analysis of each of the component streams which are obtained from individual tanks. Referring to FIG. 2, there is shown a computer implemented, property based blend control system 100. The system 100 in accordance with the present disclosure includes individual component tanks (not shown in figures) for storing respective components.

The component streams (stream 1, stream 2...stream n) form individual component tanks are flown into a sensor and analyzer 2.

In accordance with this embodiment of the present disclosure, the component streams from individual component tanks are processed separately by the sensor and analyzer 2, and the first attribute data generated by the sensor and analyzer 2 is the data corresponding to each of the individual component streams. The data corresponding to each of the individual component streams is processed separately by at least one processor 4, as shown in FIG. 2. In accordance with this embodiment of the present disclosure, the first attribute data (property data) is the data corresponding to each of the component streams, and the property data corresponding to each component stream is separately processed by the processor 4 to compute separate second attribute data (composition data) corresponding to each of the component streams.

In accordance with this embodiment of the present disclosure, the sensor and analyzer 2 receives the components from individual component tanks. The system 100 further includes at least one sensor and analyzer 2 which senses and analyzes the properties (first attribute) of the received component streams since the first attribute in case of this embodiment of the disclosure is the property attribute. The sensor and analyzer 2 individually analyzes the property attributes of each of the components and computes the corresponding property attribute data (first attribute data).

In accordance with this embodiment of the present disclosure, the system 100 further includes at least one optimizer 6 comprising data storage means 6B configured to store attribute based model data. The attribute based model data stored in the data storage means includes both property based model data and composition based model data. The optimizer 6 further includes a receiver 6A configured to receive the property attribute data corresponding to each of the components (first attribute data) from the sensor and analyzer 2. The optimizer 6 further includes comparator 6C configured to compare the property attribute data (first attribute data) of each of the components with the stored property based model data. By comparing the property attribute data with the stored property based model data, the comparator 6C computes optimized proportion data between each of the components in the plurality of components and enables selective drawing of the component streams based on their corresponding properties, for preparing the hydrocarbon blend.

The selective drawing of the component streams based on their corresponding properties takes place through the flow regulator 8 cooperating with the optimizer 6. Depending upon the optimized proportion data generated by the optimizer 6, the flow regulator 8 enables selective drawing of the component streams, for preparing the hydrocarbon blend.

In accordance with this embodiment of the present disclosure, the individual composition data (second attribute data) computed by the processor 4 is transmitted to the comparator 6C for the purpose of comparison with the composition based model data. By comparing the composition attribute data with the stored composition based model data, the comparator 6C computes optimized proportion data between each of the component streams in the plurality of components and enables selective drawing of the component streams based on their corresponding compositions, for preparing the hydrocarbon blend.

In accordance with another embodiment of the present disclosure, there is provided a computer implemented composition based blend control system. The structural components of the embodiment of the disclosure are similar to the embodiment described in FIG. 2.

In accordance with this embodiment of the present disclosure, the component streams from individual component tanks are processed separately by the sensor and analyzer 2, and the first attribute data generated by the sensor and analyzer 2 is the data corresponding to each of the individual component streams. The data corresponding to each of the individual component streams is processed separately by the processor 4, as shown in FIG. 2.

In accordance with this embodiment of the present disclosure, the first attribute data (composition data) is the data corresponding to each of the component streams, and the composition data corresponding to each component stream is separately processed by the processor 4 to compute separate second attribute data (property data) corresponding to each of the component streams.

In accordance with this embodiment of the present disclosure, the sensor and analyzer 2 receives the components from individual component tanks. The system 100 further includes at least one sensor and analyzer 2 which senses and analyzes the composition (first attribute) of the received component streams since the first attribute in case of this embodiment of the disclosure is the composition attribute. The sensor and analyzer 2 individually analyzes the composition attributes of each of the components and computes the corresponding composition attribute data (first attribute data).

In accordance with this embodiment of the present disclosure, the system 100 further includes at least one optimizer 6 comprising data storage means 6B configured to store attribute based model data. The attribute based model data stored in the data storage means includes both property based model data and composition based model data. The optimizer 6 further includes a receiver 6A configured to receive the composition attribute data corresponding to each of the components (first attribute data) from the sensor and analyzer 2. The optimizer 6 further includes comparator 6C configured to compare the composition attribute data (first attribute data) of each of the components with the stored composition based model data. By comparing the composition attribute data with the stored composition based model data, the comparator 6C computes optimized proportion data between each of the components in the plurality of components and enables selective drawing of the component streams based on their corresponding composition, for preparing the hydrocarbon blend.

The selective drawing of the component streams based on their corresponding composition takes place through the flow regulator 8 cooperating with the optimizer 6. Depending upon the optimized proportion data generated by the optimizer 6, the flow regulator 8 enables selective drawing of the component streams, for preparing the hydrocarbon blend.

In accordance with this embodiment of the present disclosure, the individual property data (second attribute data) computed by the processor 4 is transmitted to the comparator 6C for the purpose of comparison with the property based model data. By comparing the property attribute data with the stored property based model data, the comparator 6C computes optimized proportion data between each of the component streams in the plurality of components and enables selective drawing of the component streams based on their corresponding compositions, for preparing the hydrocarbon blend.

Figure 3:
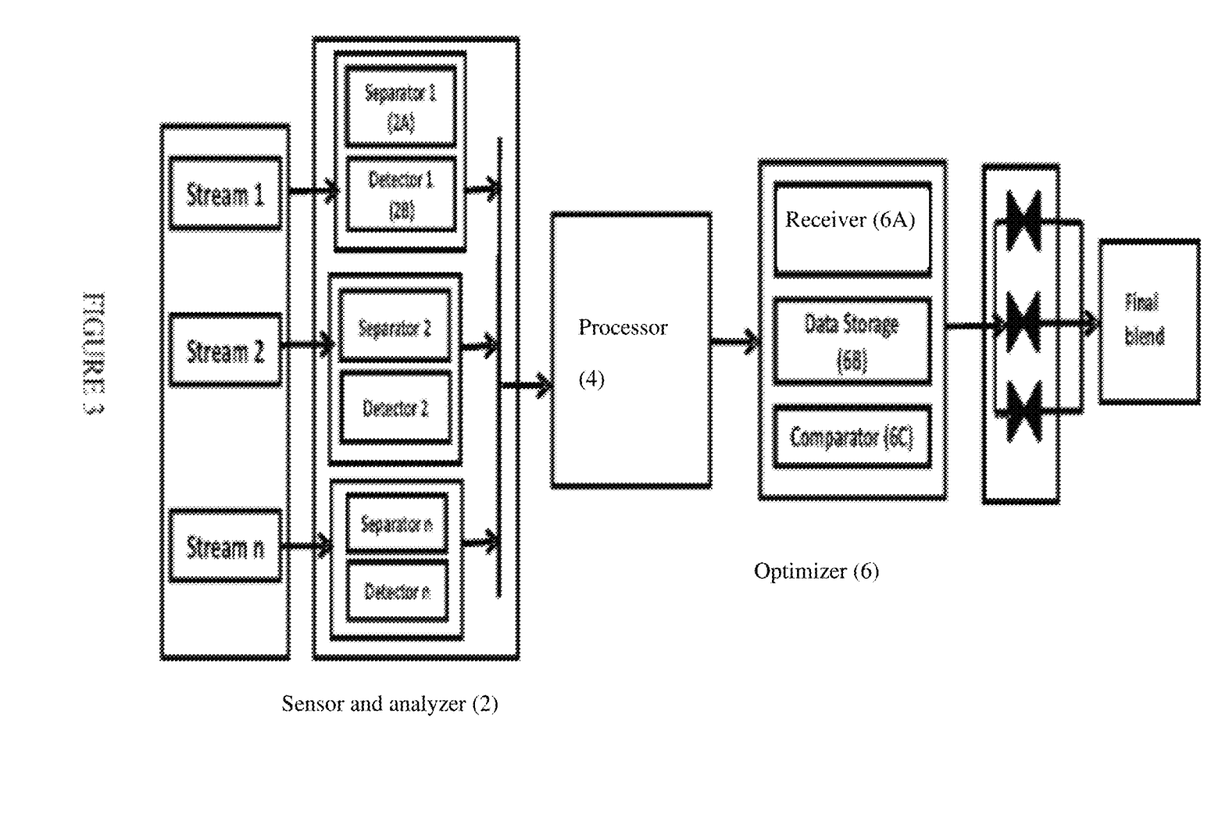
FIG. 3 illustrates a schematic of a computer implemented blend control system for property based/composition based blend optimization, wherein the component streams flow in combination through the system in accordance with another embodiment of the present disclosure.

FIG. 3 illustrates another embodiment of the present disclosure wherein the data corresponding to each of the individual component streams is processed in combination by the processor 4, as shown in FIG. 3. In accordance with this embodiment of the present disclosure, the first attribute data (property data) is the data corresponding to each of the component streams, and the property data corresponding to each component stream is processed in combination by the processor 4 to compute combined second attribute data (composition data) corresponding to each of the component streams.

In accordance with another embodiment of the present disclosure, the first attribute data (composition data) is the data corresponding to each of the component streams, and the composition data corresponding to each component stream is processed in combination by the processor 4 to compute combined second attribute data (property data) corresponding to each of the component streams.

In accordance with the present disclosure, the sensor and analyzer 2 includes a separator 2A for selectively separating the various component streams before analyzing. The sensor and analyzer 2 further includes a detector 2B configured to detect the various components flowing into the sensor and analyzer 2.

Figure 2A:
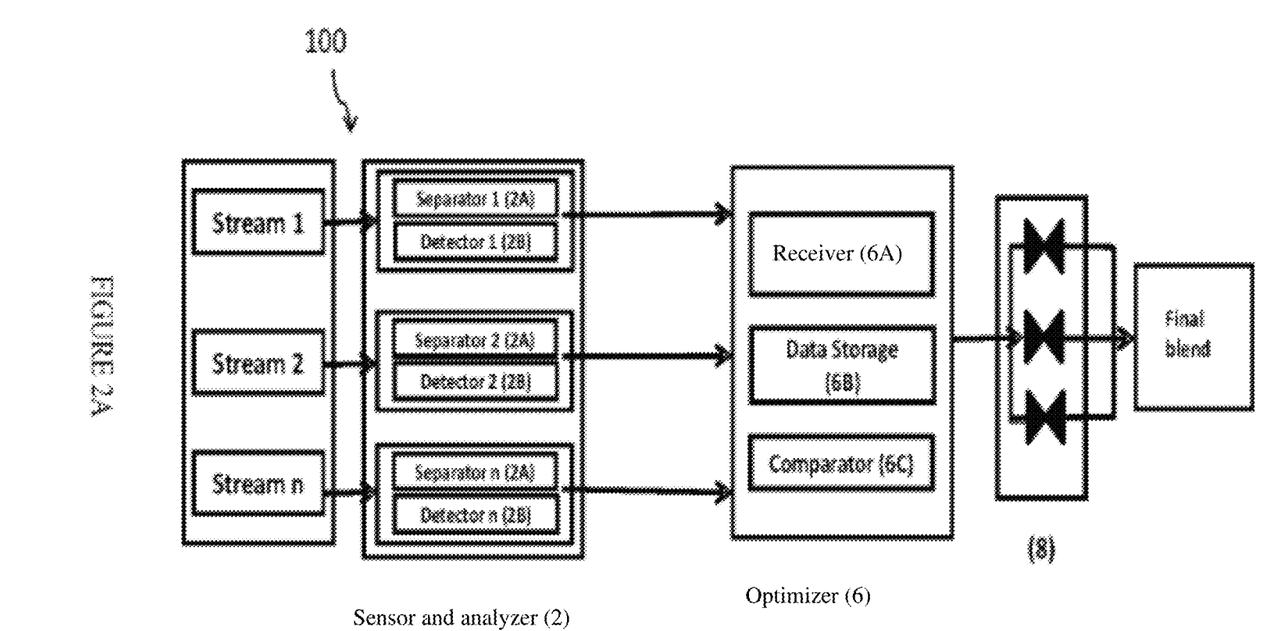
FIG. 2A illustrates a schematic of a computer implemented blend control system for property based/composition based blend optimization, in accordance with one embodiment of the present disclosure.
Figure 3A:
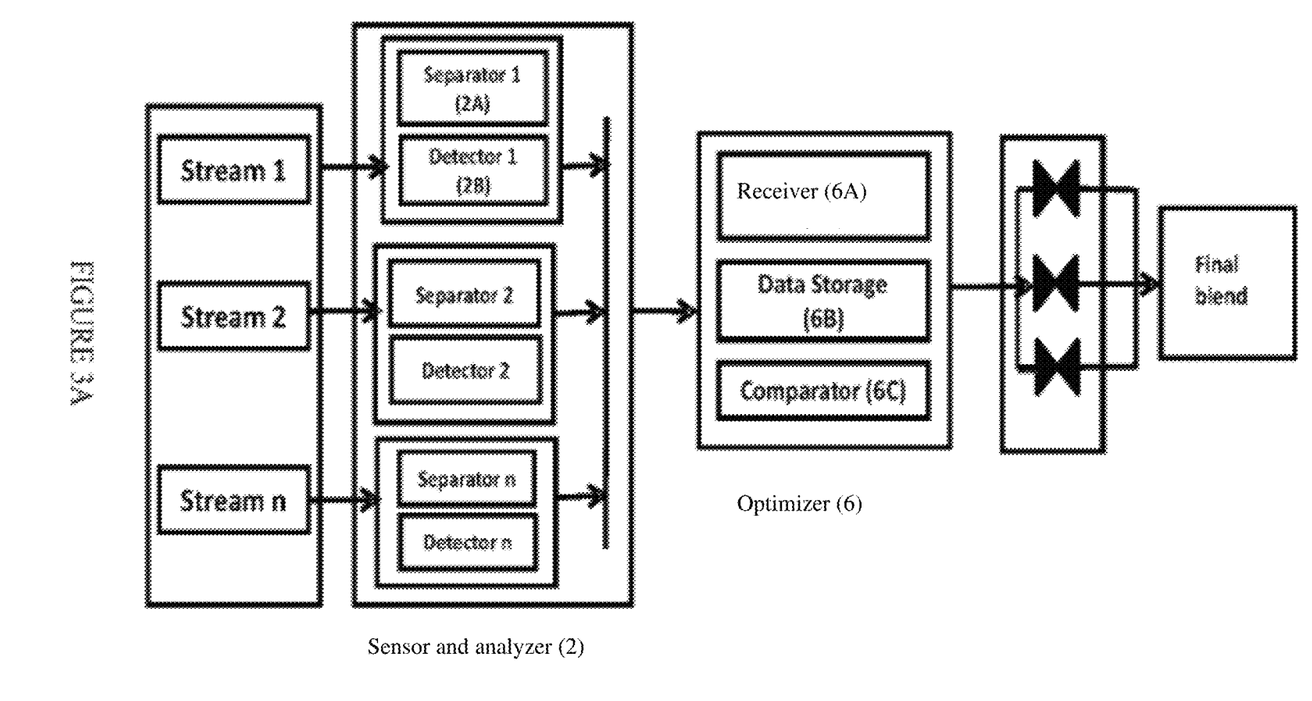
FIG. 3A illustrates a schematic of a computer implemented blend control system for property based/composition based blend optimization, in accordance with another embodiment of the present disclosure.

FIGS. 2A and 3A illustrate alternate embodiments of the present disclosure wherein the system for preparation of a hydrocarbon blend does not include a processor. The processor is omitted from the system for preparing the hydrocarbon blend, in the event that the first attribute and first attribute data are same as the second attribute and second attribute data respectively.

In accordance with another aspect of the present disclosure, there is provided a computer implemented method for the preparation of hydrocarbon blend, using the property based blend control system of the present disclosure. The method, in accordance with the present disclosure includes the following steps:
 a) drawing a plurality of components from respective component tanks;
 b) sensing and analyzing a property attribute (first attribute) of the mixture and computing a property attribute data (first attribute data);
 c) comparing the property attribute data (first attribute data) with pre-stored model data (property based model data);
 d) computing optimized values of proportions based on the comparison of the property attribute data (first attribute data) to determine proportion data between each of the component streams; and
 e) controlling flow of the component streams based on the proportion data for preparing the hydrocarbon blend.

In accordance with this embodiment of the present disclosure, the method further includes the steps of
 processing the first attribute data (property attribute data) to derive a second attribute data (composition attribute data); and
 comparing the second attribute data (composition attribute data) with the pre-stored model data (composition based model data) and computing optimized values of proportions based on the comparison of second attribute data (composition attribute data) with the pre-stored model data (composition based model data).

In accordance with another embodiment of the present disclosure, there is provided a computer implemented method for the preparation of hydrocarbon blend, using the composition based blend control system of the present disclosure. The method, in accordance with the present disclosure includes the following steps:
 a) drawing a plurality of components from respective component tanks;
 b) sensing and analyzing a composition attribute (first attribute) of the mixture and computing a composition attribute data (first attribute data);
 c) comparing the composition attribute data (first attribute data) with pre-stored model data (composition based model data);
 d) computing optimized values of proportions based on the comparison of the composition attribute data (first attribute data) to determine proportion data between each of the component streams; and
 e) controlling flow of the component streams based on the proportion data for preparing the hydrocarbon blend.

In accordance with this embodiment of the present disclosure, the method further includes the steps of:
 processing the first attribute data (composition attribute data) to derive a second attribute data (property attribute data); and
 comparing the second attribute data (property attribute data) with the pre-stored model data (property based model data) and computing optimized values of proportions based on the comparison of second attribute data (property attribute data) with the pre-stored model data (property based model data).

In accordance with the present disclosure, the first attribute, first attribute data and the second attribute, second attribute data can be the same or different from one another.

The system of the present disclosure will now be described with the help of the following non-limiting examples.

EXAMPLES (A)

Detailed hydrocarbon analyzer (DHA) with a flame ionization detector (FID) relies on single long gas chromatography (GC) column for separation, identification, quantification of naphtha-range (e.g. gasoline) molecular components. A PIONA analyzer relies on multiple GC columns and traps with specific functions to separate paraffins, iso-paraffins, olefins, naphthenes and aromatics to give a carbon number-wise breakup of naphtha-range samples. A GC-MS (Mass Spectrometry) relies on MS as a detector instead of FID for molecular identification.

Gasoline specifications depend on the grade. For example specifications of BSIII/BSIV are given below (Table 2).

TABLE 2

Gasoline specifications depending on the grade
Product specifications

|  | BS II | BS III | BS IV |
| --- | --- | --- | --- |
| Product spec. | | | |
| Density | 710-770 | 720-775 | 720-775 |
| RON min | 88 | 91 | 91 |
| MON min | — | 81 | 81 |
| AKI min | 84 | — | — |
| Sulfur max ppm | 500 | 150 | 50 |
| RVP | 60 max | 60 max | 60 max |
| Benzene max@ | 3 | 1 | 1 |
| Olefins max | — | 21 | 21 |
| Aromatics max | — | 42 | 35 |
| E 70 | 10-40 | 10-45 | 10-45 |
| E 100 | 40-70 | 40-70 | 40-70 |
| E 150 min | — | 75 | 75 |
| E 180 min | 90 | — | — |
| FBP Max | 215 | 210 | 210 |
| VLI max | | 750*/950** | |
| Oxygenates max | | 15 | 15 |

*Summer specification,
**Winter specification

TABLE 3

Comparison of (A) conventional laboratory analysis and
(B) analysis by method of the present disclosure

| Experiment | Time required | Sample quantity |
| --- | --- | --- |
| (A) Conventional Analysis | | |
| Distillation | ~45 mins | >30 ml |
| Density | ~15 mins | >30 ml |
| RVP | ~15 mins | >30 ml |
| RON | ~60 mins | >30 ml |
| MON | ~60 mins | >30 ml |

TABLE 3-continued

Comparison of (A) conventional laboratory analysis and
(B) analysis by method of the present disclosure

| Experiment | Time required | Sample quantity |
|---|---|---|
| Benzene | ~45 mins | <2 ml |
| Olefins and Aromatics | ~20 mins | >10 ml |
| (B) Analysis by the method of the present disclosure | | |
| Compositional Analysis by single Gas chromatography or multiple gas chromatography (PIONA) | 10 to 120 mins | <2 ml |

As depicted in table 3, 7 conventional laboratory experiments (conventional analysis) can be replaced by 1 experiment by the method of the present disclosure. The method also minimizes the sample quantity requirement by substantial amount and also reduces the time and effort for analysis.

(B)

Example of a Method for Preparing Gasoline Blend by "Property Based Blend Control System" and "Composition Based Blend Control System"

Figure 4A:
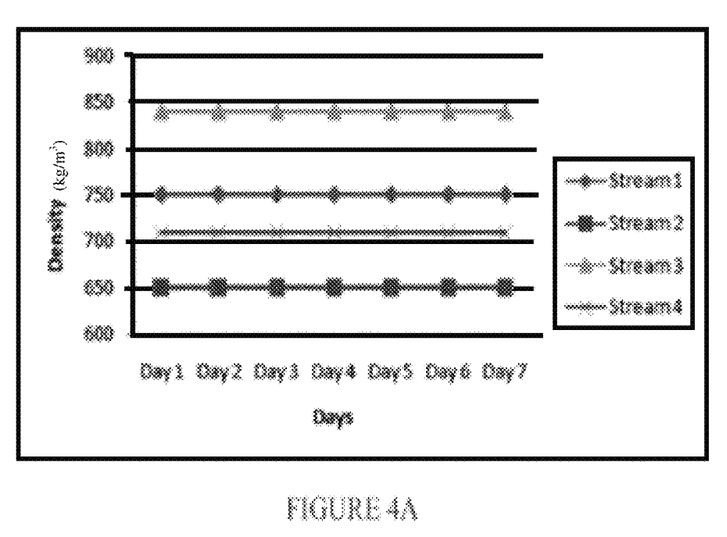
FIG. 4(A) shows a system where property data is available for 4 streams, only once a week.
Figure 4B:
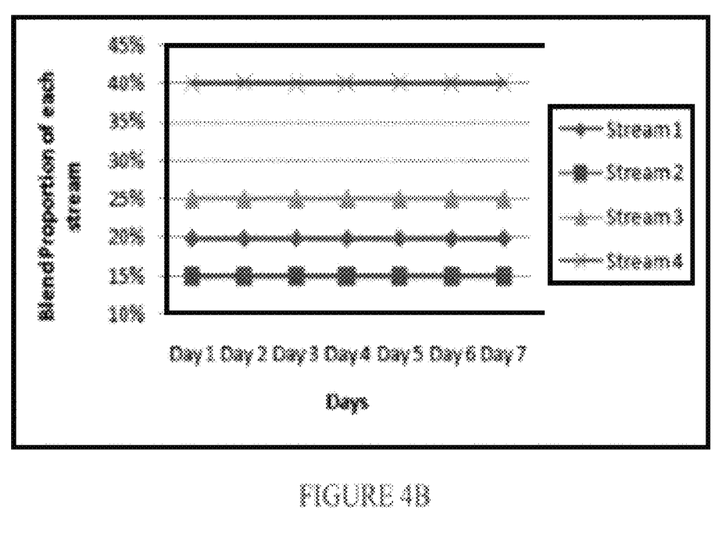
FIG. 4(B) shows that component stream proportions (recipes) are assumed to be the same throughout the week.

Comparison is made between property data collected on a daily basis/weekly basis for four different streams and product blend. FIG. 4A illustrates property data available in the presence of feedback system for four hydrocarbon streams and FIG. 4B illustrates property data available in the absence of the feedback system (online or offline) for the product blend, in which the designed recipes are the same everyday/throughout the day.

Figure 5A:
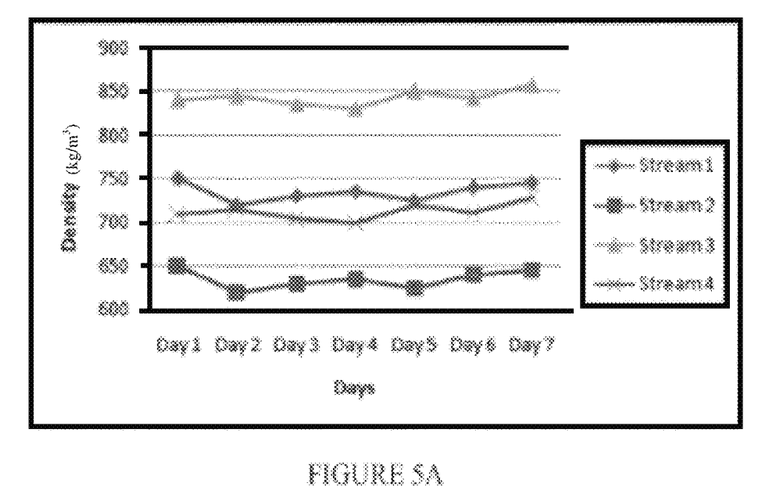
FIG. 5(A) shows a system where property data is available for 4 streams, every day
Figure 5B:
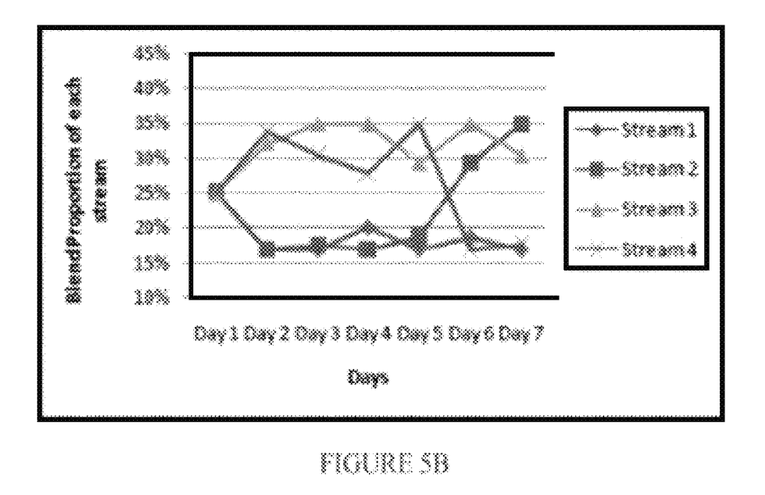
FIG. 5(B) shows that component stream proportions (recipes) are changed/optimized on a day-to-day basis.

FIG. 5A demonstrates property data available in the presence of the feedback system (online or offline) for four streams on a daily basis and in the absence of the feedback system (online or offline), in which the designed recipes fluctuating day-to-day.

(C)

Example of Comparing the Process of the Present Disclosure with Prior Art Process An offline implementation supported property based blend control system (100) shows the following benefits. The property fluctuations reduce considerably after implementation of the new system.

Figure 6:
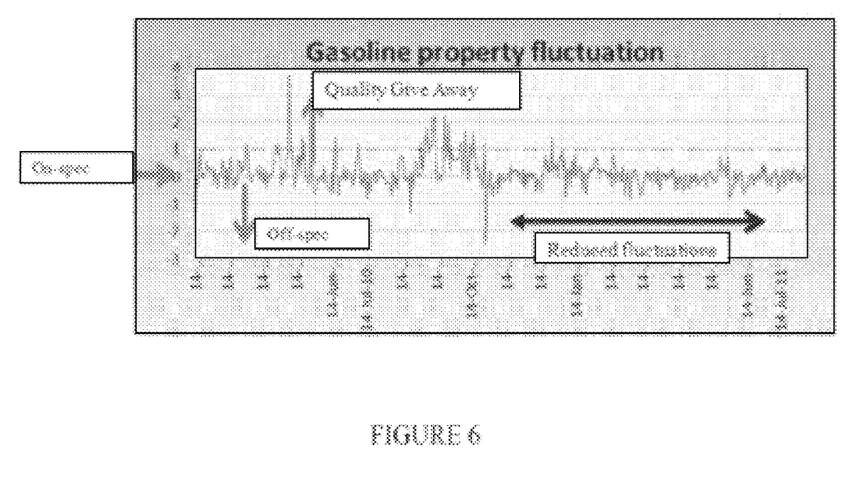
FIG. 6 illustrates the comparison of property fluctuations in the presence and in the absence of implementation of property based blend system.

FIG. 6 illustrates fluctuations in a selected property (arbitrary units) of a product gasoline stream from February 2010 to June 2011. For the first half in the graph (until November 2010) the quality is tracked based on a typical system i.e. properties of component streams from conventional measurements are measured infrequently e.g. once a month to control the hydrocarbon blending. Property fluctuation on the finished product is 0.68 units. Second half of the graph tracks the same property on an improved system with component stream properties updated daily. Property fluctuation on the finished product is considerably reduced to 0.37 units for this period.

Technical Advantages

The technical advantages of the present disclosure include the realization of the following:

providing a system and a method for the preparation of a hydrocarbon blend that allows frequent analysis of at least one of the component streams;

providing a system and a method that regulates the flow of at least one of the component streams so as to obtain a hydrocarbon blend with the desired specifications;

providing a system and a method for preparation of a hydrocarbon blend that minimizes quality give away or product failures; and providing a system and a method for the preparation of a hydrocarbon blend that allows a better process control.

The invention claimed is:

1. A computer implemented blend control system for preparation of a hydrocarbon blend from a plurality of component streams drawn from respective component tanks, said system comprising:
   a) a plurality of sensors and analyzers, wherein each sensor and analyzer of said plurality of sensors and analyzers is configured to sense and analyze a first attribute of each of the plurality of the component streams for obtaining a first attribute data of each of the plurality of the component streams, wherein each sensor and analyzer comprises a separator configured to selectively separate various component streams into its constituents and a detector configured to detect the proportion of each constituent in the component streams;
   b) a plurality of processors operatively connected to said plurality of sensors and analyzers, wherein each processor of said plurality of processors is configured to process the first attribute data of each of the plurality of the component streams for obtaining a second attribute of each of the plurality of the component streams and deriving a second attribute data of each of the plurality of the component streams;
   c) at least one optimizer connected to said plurality of processors, said at least one optimizer having:
      i) a data storage means for storing an attribute based model data;
      ii) a receiver for receiving the second attribute data; and
      iii) a comparator configured to compare the second attribute data with the attribute based model data, said comparator further configured to compute an optimized proportion data between each of the component streams to enable selective drawing of each of the component streams in accordance with the optimized proportion data for preparing the hydrocarbon blend; and
   d) a flow regulator operatively connected to the at least one optimizer and the individual component tanks, said flow regulator configured to control the flow of the component streams based on the optimized proportion data,
   wherein the first attribute of said each of the plurality of the component streams is a property attribute, the first attribute data is property data, the second attribute of said each of the plurality of the component streams is a composition attribute, the second attribute data is composition data, and the attribute based model data is composition based model data.

2. The blend control system as claimed in claim 1, wherein each of said analyzers is at least one selected from the group consisting of a detailed hydrocarbon analyzer (DHA), a PIONA analyzer and a GC-MS analyzer.

3. A computer implemented blend control system for preparation of a hydrocarbon blend from a plurality of component streams drawn from respective component tanks, said system comprising:
   a) a plurality of sensors and analyzers, wherein each sensor and analyzer of said plurality of sensors and analyzers is configured to sense and analyze a first attribute of each of the plurality of the component streams for obtaining a first attribute data of each of the plurality of the component streams, wherein each sensor and analyzer comprises a separator configured to selectively separate various component streams into its constituents and a detector configured to detect the proportion of each constituent in the component streams;
b) a plurality of processors operatively connected to said plurality of sensors and analyzers, wherein each processor of said plurality of processors is configured to process the first attribute data of each of the plurality of the component streams for obtaining a second attribute of each of the plurality of the component streams and deriving a second attribute data of each of the plurality of the component streams;
c) at least one optimizer connected to said plurality of processors, said at least one optimizer having:
 iv) a data storage means for storing an attribute based model data;
 v) a receiver for receiving the second attribute data; and
 vi) a comparator configured to compare the second attribute data with the attribute based model data, said comparator further configured to compute an optimized proportion data between each of the component streams to enable selective drawing of each of the component streams in accordance with the optimized proportion data for preparing the hydrocarbon blend; and
d) a flow regulator operatively connected to the at least one optimizer and the individual component tanks, said flow regulator configured to control the flow of the component streams based on the optimized proportion data,
wherein the first attribute of said each of the plurality of the component streams is a composition attribute, the first attribute data is composition data, the second attribute of said each of the plurality of the component streams is a property attribute, the second attribute data is property data, and the attribute based model data is property based model data.

4. The blend control system as claimed in claim 3, wherein each of said analyzers is at least one selected from the group consisting of a detailed hydrocarbon analyzer (DHA), a PIONA analyzer and a GC-MS analyzer.

* * * * *